(12) United States Patent
Chou et al.

(10) Patent No.: US 7,266,786 B2
(45) Date of Patent: Sep. 4, 2007

(54) METHOD AND APPARATUS FOR CONFIGURABLE ADDRESS MAPPING AND PROTECTION ARCHITECTURE AND HARDWARE FOR ON-CHIP SYSTEMS

(75) Inventors: Chien-Chun Chou, San Jose, CA (US); Jay Scott Tomlinson, San Jose, CA (US); Wolf-Dietrich Weber, San Jose, CA (US); Drew Eric Wingard, San Carlos, CA (US); Sricharan Kasetti, Palo Alto, CA (US)

(73) Assignee: Sonics, Inc., Mountain View, CA (US)

( * ) Notice: Subject to any disclaimer, the term of this patent is extended or adjusted under 35 U.S.C. 154(b) by 0 days.

(21) Appl. No.: 10/288,973

(22) Filed: Nov. 5, 2002

(65) Prior Publication Data

US 2004/0088566 A1    May 6, 2004

(51) Int. Cl.
*G06F 17/50* (2006.01)
*G06F 17/00* (2006.01)
(52) U.S. Cl. ............................................. 716/1; 716/8
(58) Field of Classification Search .................... 716/1, 716/7, 8, 14, 16; 707/104.1
See application file for complete search history.

(56) References Cited

U.S. PATENT DOCUMENTS

| | | | |
|---|---|---|---|
| 4,665,395 A | 5/1987 | Van Ness | |
| 5,948,089 A | 9/1999 | Wingard et al. | |
| 6,006,022 A * | 12/1999 | Rhim et al. ..................... | 716/1 |
| 6,023,565 A * | 2/2000 | Lawman et al. ................ | 716/1 |
| 6,182,183 B1 | 1/2001 | Wingard et al. | |
| 6,209,123 B1 * | 3/2001 | Maziasz et al. ................ | 716/14 |
| 6,330,225 B1 | 12/2001 | Weber et al. | |
| 6,367,058 B1 * | 4/2002 | Heile ............................. | 716/7 |
| 6,516,456 B1 * | 2/2003 | Garnett et al. ................. | 716/8 |
| 6,543,043 B1 * | 4/2003 | Wang et al. ................... | 716/14 |
| 6,725,313 B1 | 4/2004 | Wingard et al. | |
| 2003/0200520 A1 * | 10/2003 | Huggins et al. .............. | 716/16 |
| 2004/0177186 A1 | 9/2004 | Wingard et al. | |

* cited by examiner

*Primary Examiner*—Sam Rimell
(74) *Attorney, Agent, or Firm*—Blakely, Sokoloff, Taylor & Zafman LLP

(57) ABSTRACT

A method and apparatus of a configurable address mapping and protection architecture and hardware for on-chip systems have been described.

41 Claims, 7 Drawing Sheets

METHOD AND APPARATUS FOR CONFIGURABLE ADDRESS MAPPING AND PROTECTION ARCHITECTURE AND HARDWARE FOR ON-CHIP SYSTEMS

FIELD OF THE INVENTION

The present invention pertains to on-chip systems. More particularly, the present invention relates to a method and apparatus for a configurable address mapping and protection architecture and hardware for on-chip systems.

BACKGROUND OF THE INVENTION

The operational model for most computer and/or on-chip systems involves the sending of requests from one or more processing units to one or more service modules in the system. Upon receiving a request (i.e., an instruction) from a processing unit, a service module completes the task as requested. Then, there may be responses to be returned from the service module back to the processing unit. It is also very common to have a component in the system to act as both a processing unit and a service module.

Many different ways may be used to deliver requests and responses between processing units and servicing modules. One of the most frequently used methods, for delivering the requests, is by addressing (plus, protection checking). For instance, a request is tagged with a "destination address" and a "source protection identification (ID)". The destination address tells where the service module(s) is (are) located, and/or how to deliver the request to the service module(s). The source protection ID identifies the processing unit and is used to determine whether the service module(s) should execute the request, or whether the request can be delivered to the service module(s), thus providing access to the service module selectively depending on source identity. Usually, the number of transistors (often referred to as "gates") and the resulting gate size (and thus area) of the hardware module (on for example, an integrated circuit) devoted to address decoding and protection ID checking are comparatively large. Additional circuitry, which consumes more power, may also be needed in order to make this decoding and checking hardware dynamic (i.e., configurable) during operation. For a wireless device, especially, where the demand for a smaller chip die size and a lower power consumption is high, a large and power-consuming address decoding and protection-checking module is unacceptable. This presents problems.

BRIEF DESCRIPTION OF THE DRAWINGS

The invention is illustrated by way of example and not limitation in the figures of the accompanying drawings, in which like references indicate similar elements and in which.

DETAILED DESCRIPTION

A method and apparatus for a configurable address mapping and protection architecture and hardware for on-chip systems are described.

Figure 1:
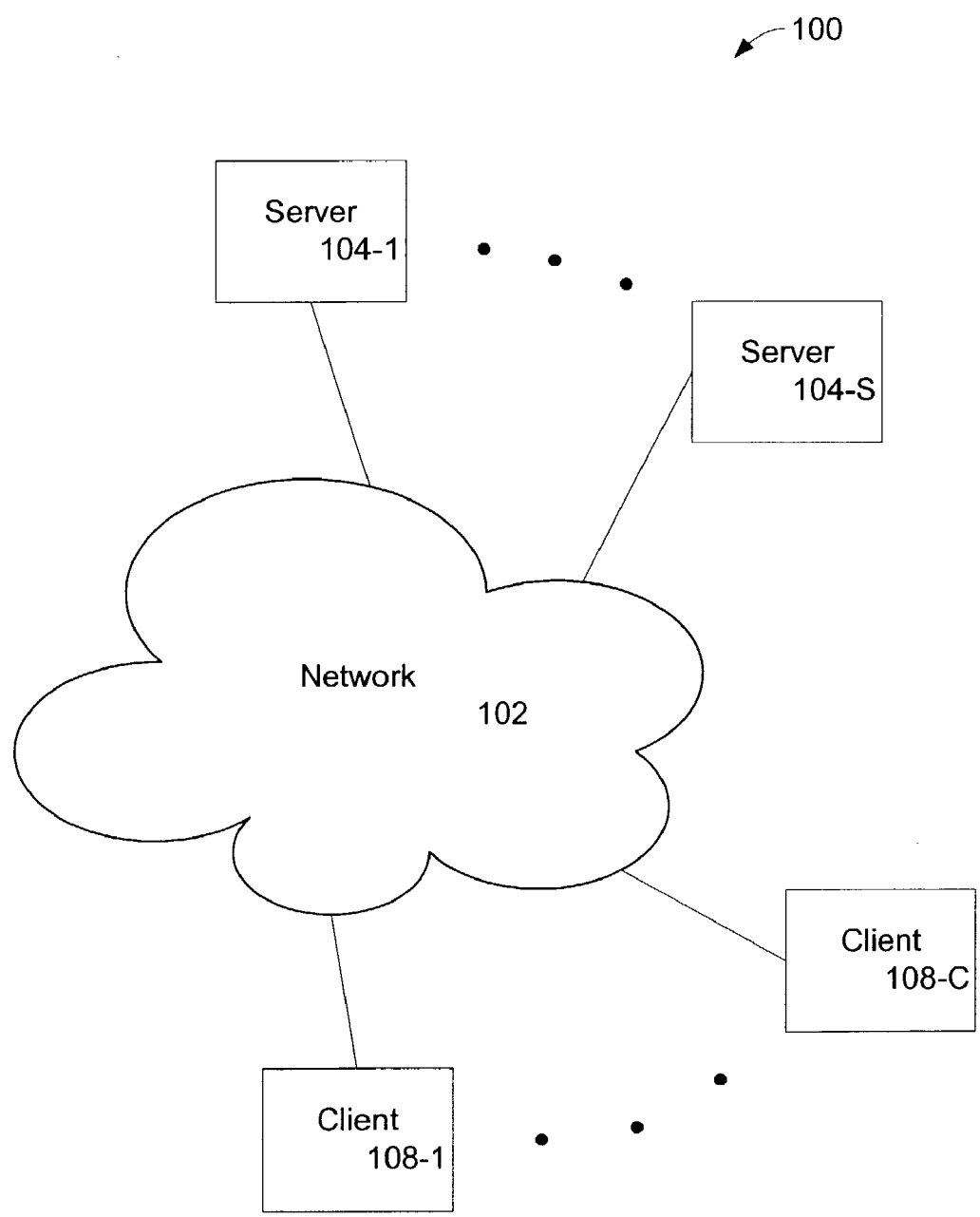
FIG. 1 illustrates a network environment in which the method and apparatus of the present invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
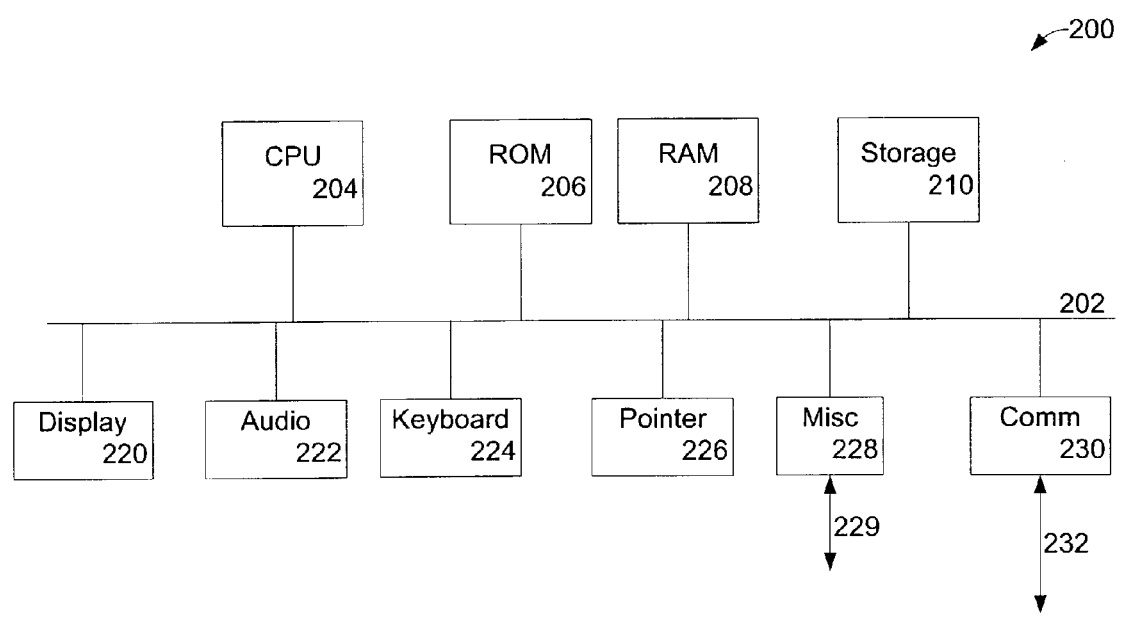
FIG. 2 is a block diagram of a computer system.

FIG. 2 illustrates a computer system 200 in block diagram form, which may be representative of any of the clients and/or servers shown in FIG. 1. More details are described below.

The term IP as used in this document denotes Intellectual Property. The term IP, may be used by itself, or may be used with other terms such as core, to denote a design having a functionality. For example, an IP core or IP for short, may consist of circuitry, buses, communication links, a microprocessor, etc. Additionally, IP may be implemented in a variety of ways, and may be fabricated on an integrated circuit, etc. The term flooding is used to denote a communication in which an incoming packet is duplicated and sent out on every outgoing pathway throughout most of a chip, system, etc.

In this disclosure, a method and apparatus for a configurable address mapping and protection architecture and hardware for on-chip systems are described. In one embodiment of the invention, circuitry for providing the necessary address mapping and protection functionality is provided in hardware. In another embodiment the invention allows a product designer to configure the address mapping and protection module at design time, such that, only the minimum specified mapping and protection is implemented into the hardware. Thus, the final gate size and power consumption of the address mapping and protection hardware module is determined by the specification of the product. Moreover, the address width and data word width for each of the service modules may also be considered and used to minimize the number of signal wires to/from the service modules. This may result in hardware that is not over designed and may more easily meet the gate count and power consumption requirements of a product.

The disclosed invention "configurable address mapping and protection architecture and hardware for on-chip systems" may provide:

1. A centralized, configurable address mapping and protection architecture for an on-chip system.
2. A set of configuration parameters that may lead to overall gate size reduction, power consumption reduction, and/or the elimination of unnecessary signal wires for a final address mapping and protection hardware module.

3. The ability for a designer to configure the address mapping and protection hardware module at design time using a specification language and achieve the goal of producing a minimized hardware implementation.

Figure 4:
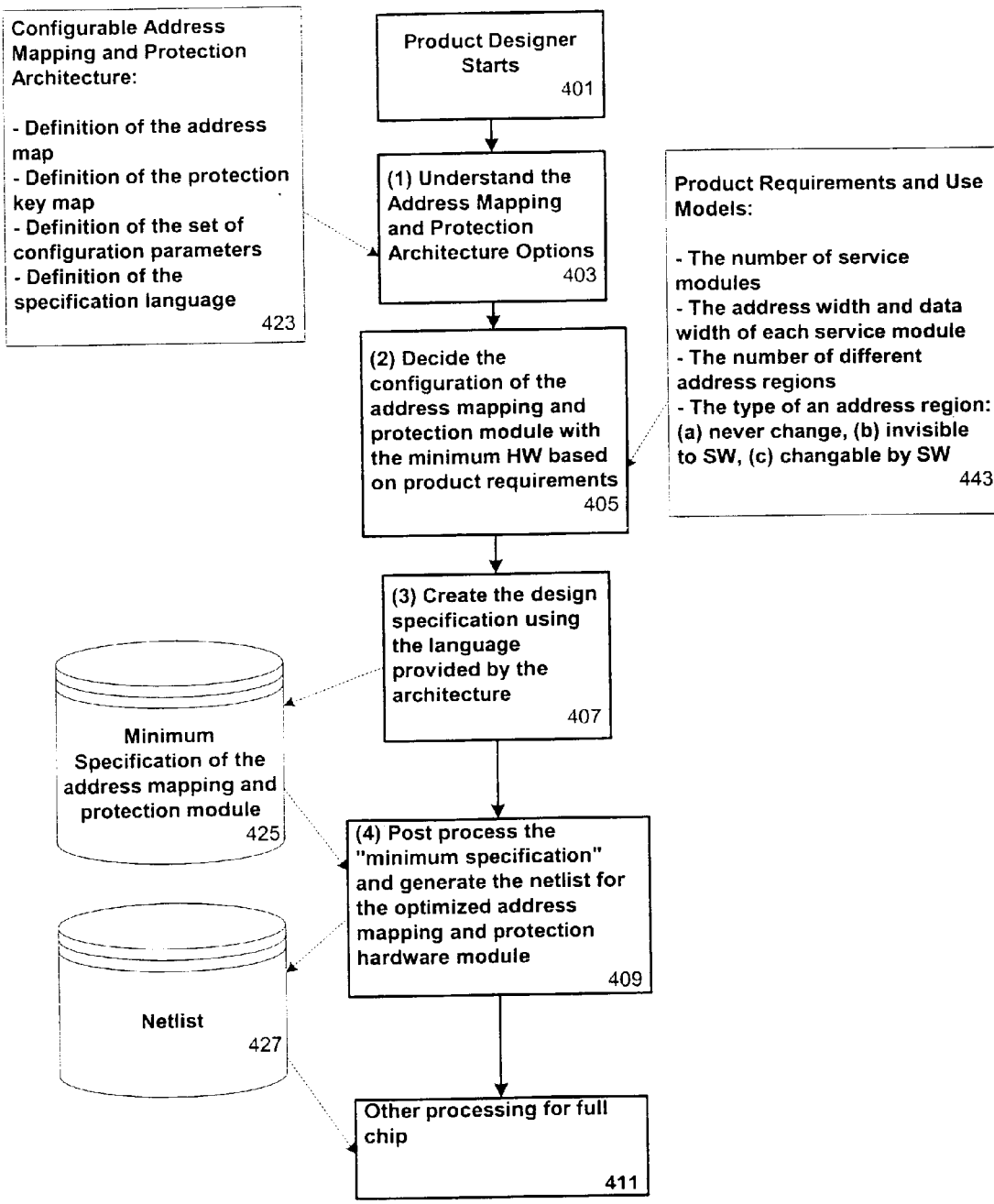
FIG. 4 illustrates one embodiment of the invention showing in a flowchart form the process in generating optimized address mapping and protection hardware.

FIG. 4 shows the processing flow that can be used in generating optimized address mapping and protection hardware. First, a product designer must understand the configurable architecture (403). The architecture (423) includes the definition of the address mapping scheme, the definition of the protection scheme, the definition of the set of configuration parameters, and the definition of the specification language. Then, the designer can design the address mapping and protection module with minimum hardware based upon the product requirements (405). Based on the product requirements and user models, the designer should be able to decide, for instance, the number of service modules in the system, the number of address regions for a service module, and how the information of an address region is going to be used (443).

Next the designer needs to specify the address mapping and protection hardware module using the provided specification language (407 and 425). At the end (409), a post-processing tool, which takes the design specification as input, is used and generates an optimized hardware gate-level netlist (427) for the address mapping and protection hardware.

Figure 3:
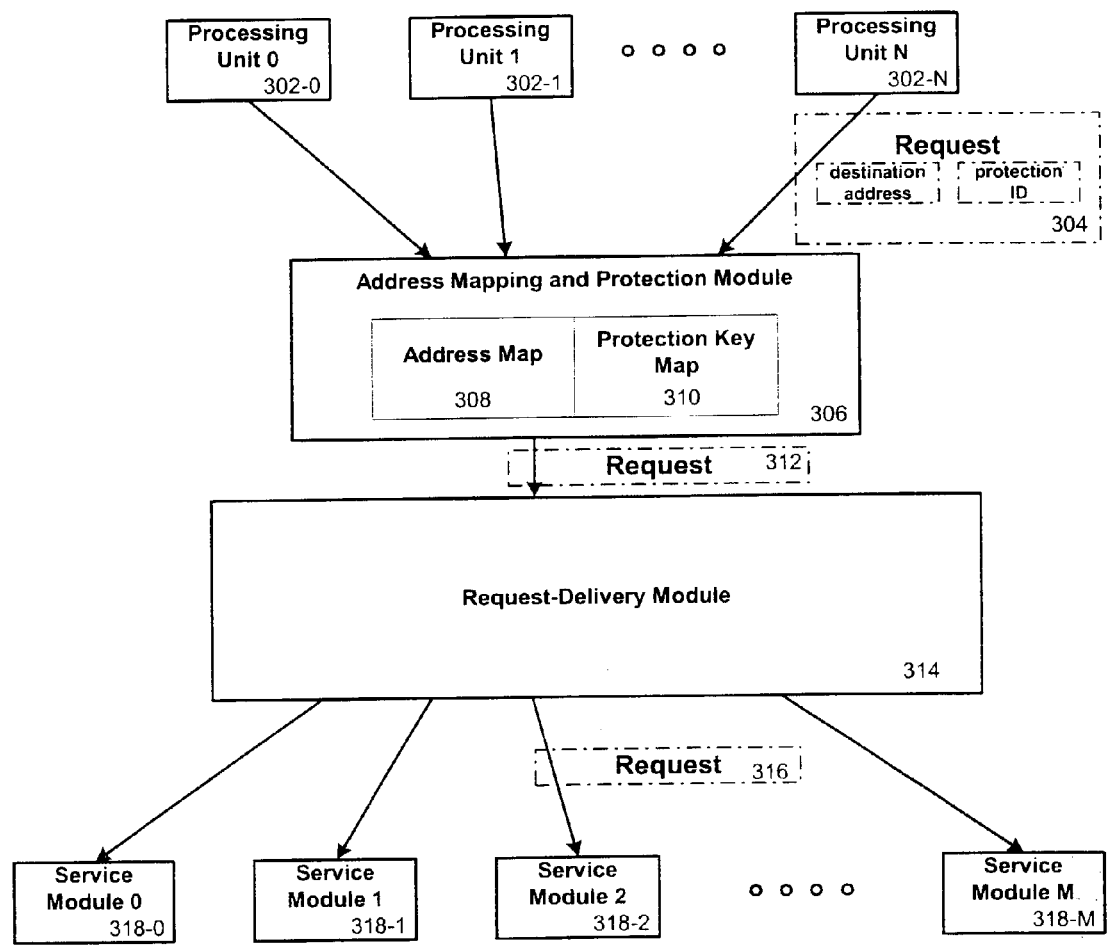
FIG. 3 illustrates one embodiment of the invention showing in a block diagram form an on-chip system with N processing units, M service modules, an address mapping and protection module, and a request-delivery module.

FIG. 3 shows a block diagram of one embodiment of the invention having an on-chip system with N processing units at the top (302-0, 302-1, through 302-N), and M service modules at the bottom (318-0, 318-1, through 318-M). In the middle of the system is an address mapping and protection module 306, showing the address mapping 308 and protection key map 310 followed by a request-delivery module 314. Note that FIG. 3 only shows the request delivery side of the system (i.e., the request side and does not show the return side). In one embodiment of the invention, the use model of the system is the following:

- A request is sent from a processing unit (such as 320-N) to the address mapping and protection module (306).
- In the address mapping and protection module 306, the "destination address" and "source protection ID" are extracted out of the request (such as that illustrated at 304). The address is decoded and compared against the address map (308) to find out where the service module is and how to deliver the request to the module. The given protection ID is checked against the protection key map (310) to determine whether the request should be delivered to the service module because the protection allows it. Note that other possible fields inside a request, not shown in FIG. 3, are "request type field", "data field", "data type field" (e.g., to indicate that it is a burst data stream), and "user provided request information" (e.g., user can use this field to provide a proprietary, sub request type).
- Next, the request (such as that illustrated at 312 and 316) is sent to the service module (such as 318-2) by the request-delivery module (314).

One embodiment of the invention having a configurable address mapping and protection architecture using segmentation and address regions for the on-chip system mentioned above is described here. Conceptually, the address space for the entire on-chip system may be divided into R address regions. Each service module in the system may have multiple address regions. In order to reduce the complexity of matching to I of the R address regions, multiple address regions may be grouped into one address segment. There may be up to S segments in the system. To send a request to a specific service module, a processing unit needs to tag the request with an address that is within an address region of the module. The information about an address region is kept in a region register stored in the address map hardware. Information about an address segment is kept in a segment register, which is also stored in the address map hardware.

There may be up to K different protection keys in the system; each protection key is kept in one protection key register, which resides in the protection key map hardware. Each address region is associated with at least one protection key, and each processing unit is assigned with one or more protection ID. When a request is sent from a processing unit, the request is tagged with a protection ID (such as 515 shown in FIG. 5) of the processing unit. After the request's destination address is decoded and a service module's address region is identified, the protection ID is checked against those protection keys associated with that address region to see whether it is safe to forward the request to the service module.

Figure 5:
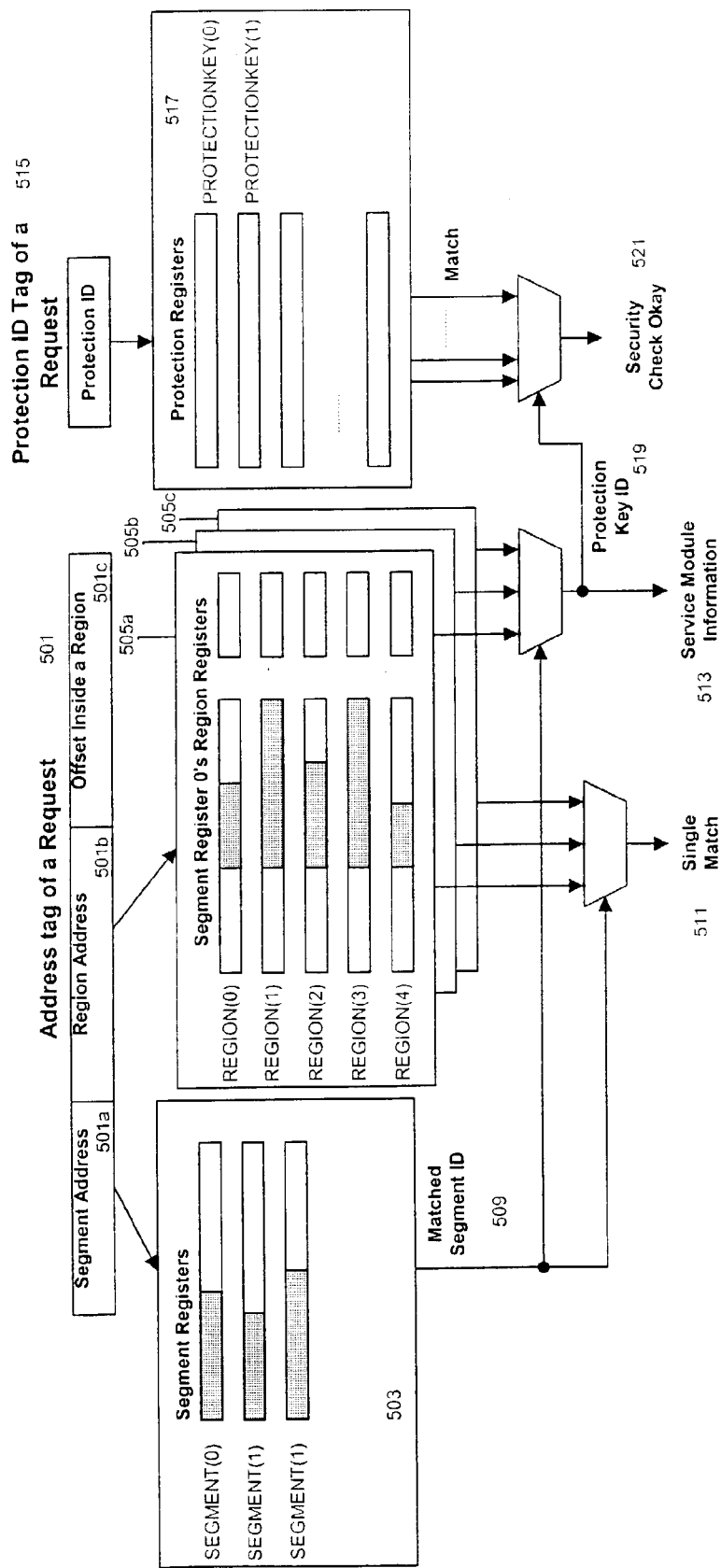
FIG. 5 illustrates one embodiment of the invention showing in block diagram form a hardware implementation for the configurable address mapping and protection architecture.

FIG. 5 shows one embodiment of the invention having a hardware implementation of the address mapping and protection architecture mentioned above. In FIG. 5, a request is shown with its destination address tag and protection ID tag (such as illustrated in FIG. 3 at 304). The destination address contains three parts, a segment (base) address part 501a, a region (base) address part 501b, and the offset within the region 501c. The address mapping hardware contains the S segment registers (503) and the R region registers (505a, b, and c, for example; and there can be more region pages as shown in FIG. 3). Each address segment may contain multiple address regions—this is illustrated by having one page of region registers associated with each segment register (pages 505a, 505b, and 505c are associated with, for example, segment register 0, segment register 1, and segment register 2, respectively. FIG. 5 also shows that the address segment 0 has five region registers (505a).

Moreover, the segment address of a request is used to match one of the segment registers (509), and the region address is used to match one or more of the region registers kept in the address map. Combining the two matching signals, in a normal case, one single match happens (511). Note that a duplicate match and a failed match may be detected, if desirable, as errors.

If a single match occurs, the protection key register number associated with the region is returned (519); and the routing information for the targeting service module is also returned (513). The protection key register number (519) is used to filter out unrelated matches coming out of the protection key map module (517). A positive security okay signal (521) indicates that the request can be delivered to the servicing module.

Table 1 shows a summary of the combinations and the results of a normal matching case (i.e., a single address match is identified and security check is also okay), and error cases. When a single match is identified, Information (saved in the matched region register) about the destination service module is forwarded to the downstream modules. For instance,

- The protection key ID is forwarded to the "Security Check Okay" circuit in order to complete the security check.
- The destination service module's data word width and physical target ID (the physical target ID contains the physical location information of the service module) are forwarded to the request-delivery module.

TABLE 1

| Matching and checking on fields | Normal Case | Error Case 1 | Error Case 2 | Error Case 3 |
|---|---|---|---|---|
| Request's segment (base) address | Single match | Single match | Single match | Double match |
| Request's region (base) address | Single match on the region register page of the matched segment | Single match on the region register page of the matched segment | Double match on the region register page of the matched segment | Don't care |
| Request's protection ID | Okay | Not okay | Don't care | Don't care |
| Results | Information about the destination service module is generated and forwarded to the request-delivery module | Protection violation | Error found in the region address map | Error found in the segment address map |

A set of configuration parameters and registers (plus register fields in each type of register) are also identified for the architecture mentioned above such that a designer can adjust them in order to build the address mapping and protection module with minimum hardware. The final goal is to reduce the hardware module's gate size, power consumption, and signal wires. The following lists the configuration parameters, their definition, and how they can affect hardware:

DataWidth: This parameter represents the data word size of a request. Different data word sizes can be allowed for requests coming from different processing units. However, only a single data width parameter is used here; thus, requests coming from the processing units have the same data word size. Setting this parameter to only the needed data word size can save gates and wires in the hardware module.

AddrWidth: This parameter represents the address tag width for the on-chip system; i.e, the dimension of the address mapping and protection module. Setting this parameter to only the needed address width can save a great number of gates and wires in the hardware module.

NumSegments: This parameter indicates how many segment registers can exist in the system and is used to removed un-needed segment registers.

For each segment register:
  SegmentSize register field: This field tells the size of a segment; it can be used to reduce the number of bits for a segment register.
  SegmentBase register field: This field indicates the segment base address of an address segment.

NumRegions: This parameter indicates how many region registers can exist in the system and is used to remove un-needed region registers.

For each region register:
  RegionSize register field: This field tells the size of an address region; it can be used to reduce the number of bits for a region register.
  RegionBase register field: This field indicates the region base address of an address region.
  RegionProtectionKeyRegisterNum (RPKRN) register field: This field tells which protection key register is to be used by the security checking logic when a single match occurs on this address region. Multiple register fields of this type can exist, however, only one is used here.

RegionDataWidth register field: This field tells the data word width of the service module that links to an address region. It can be used to trim data bus wires, if possible, connecting to the service module. It can also be used to indicate whether data packing or unpacking is needed; packing or unpacking may be needed when the data word size of a request's source processing unit is different from the data word size of the request's destination service module.

RegionPhysicalTargetID (RPTID) register field: This field describes the physical linkage between an address region and a service module. This physical linkage can be, for example: (1) hardware routing information to be passed on to the request-delivery module in order to deliver a request to the service module; or (2) a hardware signal bit position such that, when the request-delivery module asserts the signal, a request is sent to the service module.

RegionAddressSpace (RAS) register field: This field allows an address region of a service module to be further partitioned.

RegionEnable register field: This field indicates whether or not this region register is used for the current design or to indicate whether the region is currently available.

NumProtectionKeys: This parameter indicates how many protection key registers can exist in the system and is used to remove un-needed protection key registers. In addition, it can also save bits in each of the region registers, where a protection key number is stored.

For each protection key register:
  ProtectionKeyBitVector register field: This bit vector tells which protection IDs are allowed to access the service modules that are linked by region registers pointing to this protection key register. A bit 1 in position N indicates that a request tagged with protection ID of N is okay to access the request's destination service module.

NumProtectionIDs: This parameter indicates how many different protection IDs can exist in the system and is used to removed un-needed protection key bits in the ProtectionKeyBitVector register field.

Endianess: This parameter tells whether the big endianess or little endianess is applied in the architecture; it determines the address byte location and the data byte sequence coming out of data packing/unpacking.

Moreover, the register fields of each of the registers can also be specified to be one of the following three usage types so that a minimum logic design can be applied to construct the hardware to save area and power:

Non-Accessible (NA) Register Field: A register field is hardwired to a power-on value and cannot be read, nor written.

Read-Only (RO) Register Field: A register field is hardwired to a power-on value and needs to be software visible (read-only) during operation. In this case, extra gates are needed in order to allow the software read access of the register field.

Read-Write (RW) Register Field: A register field can be read and written by software dynamically. For this type of register field, extra circuitry (for example, in the form of flip-flops and gates) is needed in order to allow software changes.

Additionally, each register field can also be specified as an "exporting constant" (EC) register field such that the netlist portion of the register field is exported to the top-level of the final netlist. It makes the power-on value of a register field more easily to be manually modified, as needed by a product, late during the full chip generation process. For instance, the ProtectionKeyBitVector register field of each of the protection key registers can be declared as "exporting constant" field; therefore, it allows a final protection key map to be put into the chip late in the product generation process.

Figure 6:
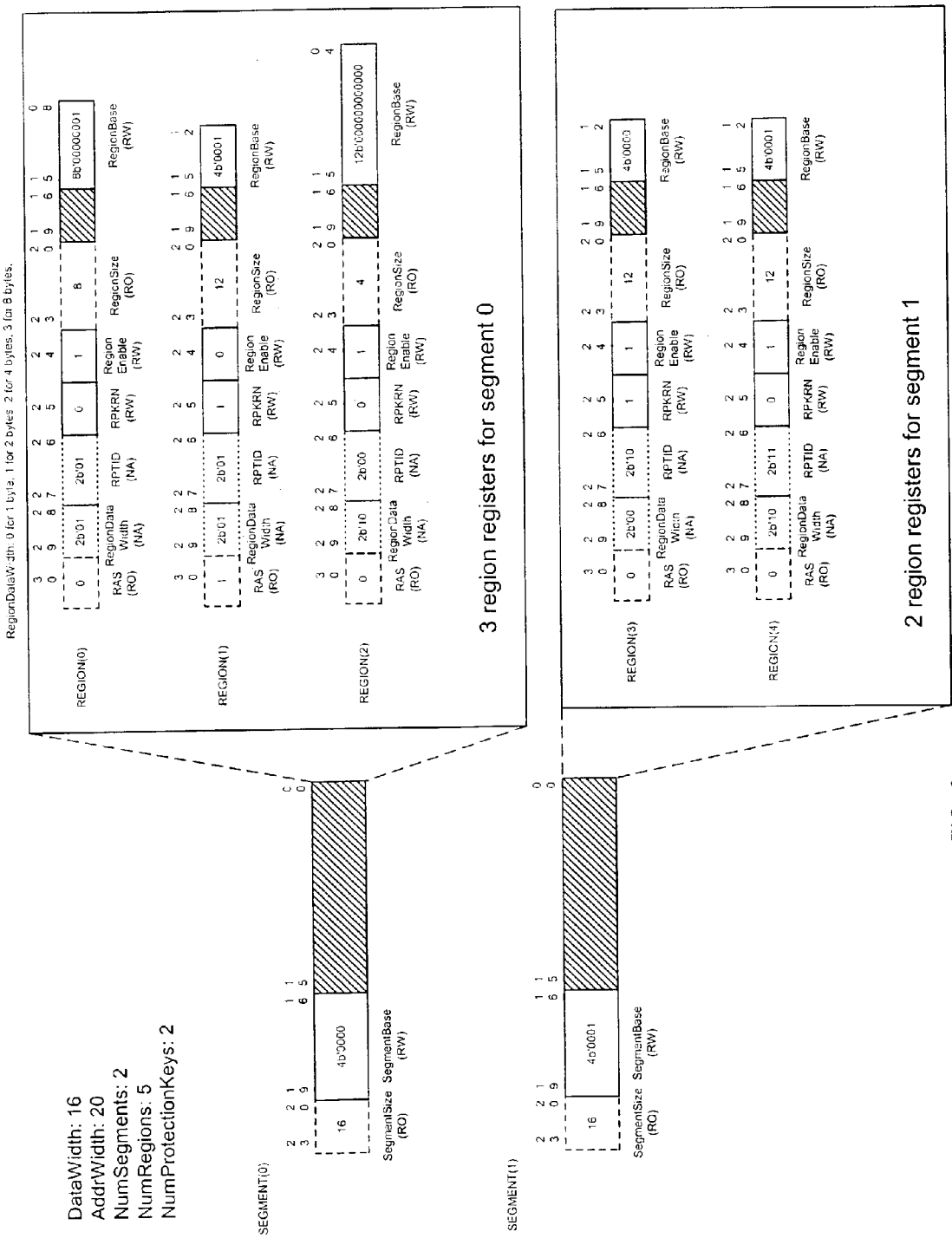
FIG. 6 illustrates one embodiment of the invention showing in table form, a definition of some possible read-only, read-write, or not-accessible configuration parameters.
Figure 7:
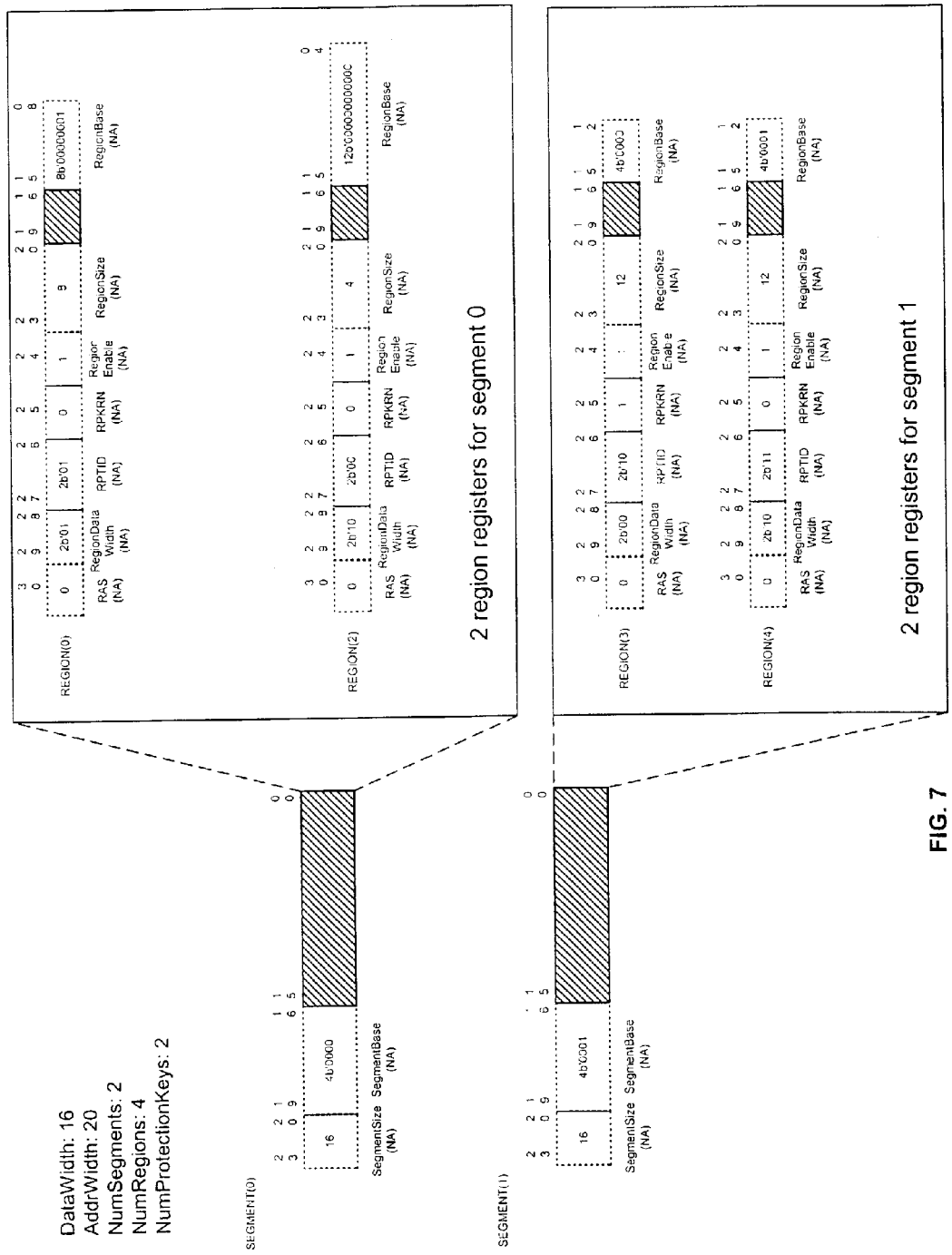
FIG. 7 illustrates one embodiment of the invention showing in table form, a definition of some possible not-accessible configuration parameters.

FIG. 6 and FIG. 7 show two almost identical address mapping and protection configurations. The register fields in FIG. 6 are of RO, RW, or NA type; however, for FIG. 7, all register fields are of NA type, plus, the un-used region register 1 is removed. From a first-order estimation, the number of flip-flops (also referred to as flops) saved in FIG. 7 is 82; that is no flops are used in the address map (308) and the protection key map (310) as shown in the center of FIG. 3. Also note that, if (1) the address width of the hardware module is reduced from 20 to 17, and (2) the number of protection IDs is scaled down to 8, additional buffer register bits and signal wires can be saved versus the FIG. 6 case.

As mentioned previously, a specification language needs to be provided so that a designer may easily specify a minimum design for a product. The following lists, in one embodiment of the invention, an example specification as shown in FIG. 6:

```
Address Mapping and Protection Module }
    DataWidth: 16
    AddrWidth: 20
    Endianess: little
    NumSegments: 2
    NumRegions: 5
    NumProtectionKeys: 2
    NumProtectionKeyIDs: 16
    SEGMENT(0) {
        SegmentSize: 64KB { access RO }
        SegmentBase: 0x00000 { access RW }
    }
    SEGMENT(1) {
        SegmentSize: 64KB { access RO }
        SegmentBase: 0x10000 { access RW }
    }
    REGION(0) {
        Inside SEGMENT(0)
        RegionSize: 256B { access RO }
        RegionBase: 0x00100 { access RW }
        RegionProtectionKeyRegisterNum: 0 { access RW }
        RegionDataWidth: 2B { access NA }
        RegionPhysicalTargetID: link to ServiceModule 1 using
            "targetselect pin 1" { access NA }
        RegionAddressSpace: 0 { access RO }
        RegionEnable: Yes { access RW }
    }
    REGION(1) {
        Inside SEGMENT(0)
        RegionSize: 4KB { access RO }
        RegionBase: 0x01000 { access RW }
        RegionProtectionKeyRegisterNum: 1 { access RW }
        RegionDataWidth: 2B { access NA }
        RegionPhysicalTargetID: link to ServiceModule 1 using
            "targetselect pin 1" { access NA }
        RegionAddressSpace: 1 { access RO }
        RegionEnable: No { access RW }
    }
    REGION(2) {
        Inside SEGMENT(0)
        RegionSize: 16B { access RO }
        RegionBase: 0x00000 { access RW }
        RegionProtectionKeyRegisterNum: 0 { access RW }
        RegionDataWidth: 4B { access NA }
```

-continued

```
        RegionPhysicalTargetID: link to ServiceModule 0 using
            "targetselect pin 0" { access NA }
        RegionAddressSpace: 0 { access RO }
        RegionEnable: Yes { access RW }
    }
    REGION(3) {
        Inside SEGMENT(1)
        RegionSize: 4KB { access RO }
        RegionBase: 0x10000 { access RW }
        RegionProtectionKeyRegisterNum: 1 { access RW }
        RegionDataWidth: 1B { access NA }
        RegionPhysicalTargetID: link to ServiceModule 2 using
            "targetselect pin 2" { access NA }
        RegionAddressSpace: 0 { access RO }
        RegionEnable: Yes { access RW }
    }
    REGION(4) {
        Inside SEGMENT(1)
        RegionSize: 4KB { access RO }
        RegionBase: 0x11000 { access RW }
        RegionProtectionKeyRegisterNum: 0 { access RW }
        RegionDataWidth: 4B { access NA }
        RegionPhysicalTargetID: link to ServiceModule 3 using
            "targetselect pin 3" { access NA }
        RegionAddressSpace: 0 { access RO }
        RegionEnable: Yes { access RW }
    }
    PROTECTIONKEY(0) {
        ProtectionKeyBitVector: 0x007B { access RW and EC }
    }
    PROTECTIONKEY(1) {
        ProtectionKeyBitVector: 0x0085 { access RW and EC }
    }
```

For the above example (also shown in FIG. 6), there are 2 segments and 5 address regions; the address region 1 is disabled at the initialization time (i.e., the region register's RegionEnable field is set to "No"), but can be re-configured at run-time because the field is read/writable. There are two protection key registers and each has a 16-bit bit vector. The example also specifies the following at power-on:

The request address width is 20 bits and data word size is 16 bits.

There are four service modules: ServiceModule 0, 1, 2, and 3.

Address region 0, 1, and 2 exist in the address segment 0 and are based at address 0x00100, 0x01000, and 0x0000, and of size 256 bytes, 4 K bytes, and 16 bytes, respectively. The region register 1 is not enabled at the current time, but, can be used as a future addition.

Address region 3 and 4 exist in the address segment 1 and are based at address 0x10000 and 0x11000, respectively; both are 4K-byte in size.

Requests coming from processing units using Protection ID 0, 1, 3, 4, 5, and 6 (the ProtectionKeyBitVector of 0x007B) can go to ServiceModule 0, 1, and 3, depending on the request address. Requests coming from processing units using Protection ID 0, 2, and 7 (the ProtectionKeyBitVector of 0x0085) can go to ServiceModule 2, if the request address falls into the address region 3.

For the design shown in FIG. 7, its specification looks like the following:

```
Address Mapping and Protection Module }
    DataWidth: 16
    AddrWidth: 20
    Endiness: little
```

-continued

```
NumSegments: 2
NumRegions: 4
NumProtectionKeys: 2
NumProtectionKeyIDs: 16
SEGMENT(0) {
    SegmentSize: 64KB { access NA }
    SegmentBase: 0x00000 { access NA }
}
SEGMENT(1) {
    SegmentSize: 64KB { access NA }
    SegmentBase: 0x10000 { access NA }
}
REGION(0) {
    Inside SEGMENT(0)
    RegionSize: 256B { access NA }
    RegionBase: 0x00100 { access NA }
    RegionProtectionKeyRegisterNum: 0 { access NA }
    RegionDataWidth: 2B { access NA }
    RegionPhysicalTargetID: link to ServiceModule 1 using
        "targetselect pin 1" { access NA }
    RegionAddressSpace: 0 { access NA }
    RegionEnable: Yes { access NA }
}
REGION(2) {
    Inside SEGMENT(0)
    RegionSize: 16B { access NA }
    RegionBase: 0x00000 { access NA }
    RegionProtectionKeyRegisterNum: 0 { access NA }
    RegionDataWidth: 4B { access NA }
    RegionPhysicalTargetID: link to ServiceModule 0 using
        "targetselect pin 0" { access NA }
    RegionAddressSpace: 0 { access NA }
    RegionEnable: Yes { access NA }
}
REGION(3) {
    Inside SEGMENT(1)
    RegionSize: 4KB { access NA }
    RegionBase: 0x10000 { access NA }
    RegionProtectionKeyRegisterNum: 1 { access NA }
    RegionDataWidth: 1B { access NA }
    RegionPhysicalTargetID: link to ServiceModule 2 using
        "targetselect pin 2" { access NA }
    RegionAddressSpace: 0 { access NA }
    RegionEnable: Yes { access NA }
}
REGION(4) {
    Inside SEGMENT(1)
    RegionSize: 4KB { access NA }
    RegionBase: 0x11000 { access NA }
    RegionProtectionKeyRegisterNum: 0 { access NA }
    RegionDataWidth: 4B { access NA }
    RegionPhysicalTargetID: link to ServiceModule 3 using
        "targetselect pin 3" { access NA }
    RegionAddressSpace: 0 { access NA }
    RegionEnable: Yes { access NA }
}
PROTECTIONKEY(0) {
    ProtectionKeyBitVector: 0x007B { access NA and EC }
}
PROTECTIONKEY(1) {
    ProtectionKeyBitVector: 0x0085 { access NA and EC }
}
```

As mentioned in the description, and as shown in FIG. 4, at one of the final stages, a post-processing tool, which takes the specified design (such as the specification text shown above) as input, is used and generates an optimized hardware netlist for the address mapping and protection hardware.

Thus, what has been disclosed is a method and apparatus of a configurable address mapping and protection hardware for on-chip systems.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several systems in the form of S servers 104-1 through 104-S and C clients 108-1 through 108-C are connected to each other via a network 102, which may be, for example, an on-chip communication network. Note that alternatively the network 102 might be or include one or more of: inter-chip communications, an optical network, the Internet, a Local Area Network (LAN), Wide Area Network (WAN), satellite link, fiber network, cable network, or a combination of these and/or others. The servers may represent, for example: a master device on a chip; a memory; an intellectual property core, such as a microprocessor, communications interface, etc.; a disk storage system; and/or computing resources. Likewise, the clients may have computing, storage, and viewing capabilities. The method and apparatus described herein may be applied to essentially any type of communicating means or device whether local or remote, such as a LAN, a WAN, a system bus, on-chip bus, etc. It is to be further appreciated that the use of the term client and server is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as 108-1 and 104-S can both initiate and respond to communications, their communication may be viewed as peer-to-peer. Likewise, communications between 104-1 and 104-S, and 108-1 and 108-C may be viewed as peer to peer if each such communicating device is capable of initiation and response to communication.

Referring back to FIG. 2, FIG. 2 illustrates a system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as an on-chip bus, a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of the system, the system may include some, all, more, or a rearrangement of components in the block diagram. For example, an on-chip communications system on an integrated circuit may lack a display 220, keyboard 224, and a pointer 226. Another example may be a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "communicating" or "displaying" or the like, can refer to the action and processes of a computer system, or an electronic device, that manipulates and transforms data represented as physical (electronic) quantities within the electronic device or computer system's registers and memories into other data similarly represented as physical quantities within the electronic device and/or computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), digital versatile disk (DVD), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network. This communications network is not limited by size, and may range from, for example, on-chip communications to WANs such as the Internet.

The methods of the invention may be implemented using computer software. If written in a programming language conforming to a recognized standard, sequences of instructions designed to implement the methods can be compiled for execution on a variety of hardware platforms and for interface to a variety of operating systems. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical, or other form of propagated signals (e.g., carrier waves, infrared signals, digital signals, etc.); etc.

Thus, a method and apparatus for a configurable address mapping and protection architecture and hardware for on-chip systems have been described.

What is claimed is:

1. A method comprising:
inputting configuration parameters that identify a first address location to a service module;

inputting protection parameters, wherein the protection parameters are selected from the group consisting of a number of different protection keys that can exist for modules in a device and a number of different protection IDs that can exist for modules in the device; and determining whether a request from a first module in the device should be passed on to the service module and executed based upon the inputted protection parameters and the first address location of the service module.

2. The method of claim 1 wherein said configuration parameters are selected from the group consisting of address width, number of segments, segment size, segment base, and number of regions.

3. The method of claim 2 further comprising for each region of said number of regions a field selected from the group consisting of region address size, region base address, region protection key register number, region enable, region address space, width of a service module connected to said region, and physical linkage information of a service module connected to said region.

4. The method of claim 3 wherein said physical linkage information of a service module connected to said region further comprises information selected from the group consisting of routing information, and a position.

5. The method of claim 4 wherein said routing information comprises hardware routing information passed to a request-delivery module in order to deliver a request to said service module.

6. The method of claim 4 wherein said position comprises a hardware signal bit position.

7. The method of claim 6 wherein if a request-delivery module asserts a signal at said hardware signal bit position a request is sent to said service module.

8. The method of claim 1 further comprising:
generating a database for configuring circuitry, wherein said circuitry further comprises a register.

9. The method of claim 8 wherein said configuring results in an operative mode selected from the group consisting of non-accessible register, read only register, and read-write register.

10. The method of claim 8 wherein said configuring said register further comprises specifying said register as an export constant so that in said database a netlist portion of said register is exported to a top level of a netlist.

11. The method of claim 10 wherein said configuring further comprises configuring said netlist in time after said configuring of said register.

12. An apparatus, comprising:
means for inputting configuration parameters that identify a first address location to a service module;
means for inputting protection parameters, wherein the protection parameters are selected from the group consisting of a number of different protection keys that can exist for modules in a device and a number of different protection IDs that can exist for modules in the device; and
means for determining whether a request from a first module in the device should be passed on to the service module and executed based upon the inputted protection parameters and the first address location of the service module.

13. The apparatus of claim 12, wherein the configuration parameters are selected from the group consisting of address width, number of segments, segment size, segment base, and number of regions.

14. The apparatus of claim 13, further comprising:
a first region from the number of regions, the first region having a field containing routing information and a position of a service module connected to the region.

15. The apparatus of claim 14, wherein the routing information comprises hardware routing information passed to a request-delivery module in order to deliver a request to the service module.

16. The apparatus of claim 14, wherein the position comprises a hardware signal bit position.

17. The apparatus of claim 15, wherein if a request-delivery module asserts a signal at the hardware signal bit position a request is sent to the service module.

18. The apparatus of claim 12, further comprising:
means for generating a database for configuring circuitry, wherein the configuring circuitry may be a register that is configured by specifying the register as an export constant so that in the database a netlist portion of the register is exported to a top level of a netlist.

19. The apparatus of claim 18, wherein the configuring further comprises configuring the netlist in time after the configuring of the register.

20. The apparatus of claim 18, wherein the register may be selected from the group consisting of not-accessible registers, read-only registers. read-write registers.

21. The apparatus of claim 18, wherein the register has register fields selected from the group consisting of not-accessible register fields, read-only register fields, and read-write register fields.

22. The apparatus of claim 12, further comprising:
means for checking the inputted protection and configuration parameters against predefined criteria set at design time for an integrated circuit.

23. The apparatus of claim 22, wherein the predefined criteria are selected from the group consisting of protection ID, destination address, request type, data, data type, and user provided request information.

24. The apparatus of claim 22, wherein the means for checking checks a segment address against one or more segment register fields, and checks a region address against one or more region register fields.

25. The apparatus of claim 22, wherein the means for checking checks a protection key against one or more protection register fields.

26. The apparatus of claim 22, wherein the means for checking checks requests received from a plurality of source units against an address map and a protection key map.

27. The apparatus of claim 22, further comprising:
means for generating a request for additional parameters if the predefined criteria is met.

28. The apparatus of claim 12, further comprising:
means for receiving a product specification; and
means for generating a netlist.

29. A processing system comprising a processor, which when executing a set of requests performs the method of claim 1.

30. A machine-readable storage medium having stored instructions thereon, which when executed performs the method of claim 1.

31. The method of claim 1, further comprising:
receiving a product specification; and
generating a netlist that represents an optimized address mapping and hardware protection.

32. The apparatus of claim 12, further comprising:
means for associating a first address region in the system with at least one protection key; and means for assigning a first processing unit at least one possible protection ID.

33. An apparatus comprising:
means for inputting configuration parameters that associate a first address location with a service module;
means for inputting protection parameters, wherein the protection parameters are selected from the group consisting of a number of different protection keys that can exist for modules in a device and a number of different protection IDs that can exist for modules in the device;
means for determining whether a request from a first module in the device should be passed on to the service module and executed based upon the inputted protection parameters; and
means for comparing a first protection ID assigned to the request to a map of one or more protection key registers to determine whether the request should be passed on to the service module and executed.

34. The apparatus of claim 12, further comprising:
a first processing unit having at least two possible protection IDs.

35. An apparatus comprising:
a configuration register to input configuration parameters that associate a first address location with a service module;
a protection key register to input protection parameters, wherein the protection parameters are selected from the group consisting of a number of different protection keys that can exist for modules in a device and a number of different protection IDs that can exist for modules in the device; and
security checking logic to determine whether a request from a first module in the device should be passed on to the service module and executed based upon the inputted protection parameters and the first address location of the service module; and
a first field in a software database to direct the security checking logic on which protection key register is to be used by the security checking logic when matching a first protection ID associated with the request to first address location of the service module.

36. An apparatus comprising:
a configuration register to input configuration parameters that associate a first address location with a service module;
a protection key register to input protection parameters, wherein the protection parameters are selected from the group consisting of a number of different protection keys that can exist for modules in a device and a number of different protection IDs that can exist for modules in the device;
security checking logic to determine whether a request from a first module in the device should be passed on to the service module and executed based upon the inputted protection parameters and the first address location of the service module; and
a bit vector to direct the security checking logic on which protection IDs associated with the request are allowed to access one or more service modules that are linked by region registers pointing to a first protection key register.

37. The apparatus of claim 12, wherein a first field of protection key registers can be re-configured at run-time because the first field is read/writable.

38. The method of claim 1, further comprising:
configuring the protection parameter information at design time of an implementation of the device.

39. A machine-readable storage medium having stored instructions thereon, which when executed generates the apparatus of claim 12.

40. An apparatus, comprising:
a first set of registers for inputting configuration parameters that associate a first address location with service module;
a second set of registers for inputting protection parameters, wherein the protection parameters are selected from the group consisting of a number of different protection keys that can exist for modules in a device and a number of different protection IDs that can exist for modules in the device; and
a comparator to determine whether a request from a first module in the device should be passed on to the service module and executed based upon the inputted protection parameters in the second set of registers and the inputted configuration parameters in the first set of registers, wherein the comparator compares a first protection ID assigned to the request to a map of one or more protection key registers to determine whether the request should be passed on to the service module and executed.

41. A machine-readable storage medium having stored instructions thereon, which when executed generates the apparatus of claim 40.

* * * * *